United States Patent
Rodecker

(10) Patent No.: US 11,585,260 B2
(45) Date of Patent: Feb. 21, 2023

(54) EXHAUST ISOLATOR BRACKET WITH ALIGNMENT FEATURE

(71) Applicant: The Pullman Company, Milan, OH (US)

(72) Inventor: Troy P. Rodecker, Berlin Heights, OH (US)

(73) Assignee: The Pullman Company, Milan, OH (US)

( * ) Notice: Subject to any disclaimer, the term of this patent is extended or adjusted under 35 U.S.C. 154(b) by 68 days.

(21) Appl. No.: 17/245,222

(22) Filed: Apr. 30, 2021

(65) Prior Publication Data

US 2022/0349333 A1 Nov. 3, 2022

(51) Int. Cl.
*F01N 13/18* (2010.01)

(52) U.S. Cl.
CPC ..... *F01N 13/1822* (2013.01); *F01N 13/1805* (2013.01); *F01N 13/1811* (2013.01); *F01N 13/1861* (2013.01); *F01N 13/1872* (2013.01)

(58) Field of Classification Search
CPC ............. F01N 13/1805; F01N 13/1811; F01N 13/1822; F01N 13/1861; F01N 13/1872
See application file for complete search history.

(56) References Cited

U.S. PATENT DOCUMENTS

| 4,159,043 | A * | 6/1979 | James | B60K 5/04 |
| | | | | 248/634 |
| 8,366,069 | B2 | 2/2013 | Rodecker | |
| 9,689,521 | B2 * | 6/2017 | Noll | F01N 13/1811 |
| 2019/0024568 | A1 * | 1/2019 | Hadji | F16L 55/035 |
| 2020/0056531 | A1 * | 2/2020 | Rodecker | F16F 1/3842 |

FOREIGN PATENT DOCUMENTS

| CA | 2417814 | A1 | 8/2003 |
| CN | 209409798 | U | 9/2019 |
| DE | 202016000531 | U1 | 5/2017 |
| EP | 1378639 | A1 | 1/2004 |
| EP | 2008855 | B1 | 6/2012 |
| FR | 2898305 | B1 | 11/2011 |
| GB | 2557196 | A | 6/2018 |
| JP | 6699006 | B2 | 5/2020 |
| WO | WO-2018099706 | A1 | 6/2018 |

OTHER PUBLICATIONS

Extended European Search Report regarding Application No. 221691413, dated Sep. 29, 2022.

* cited by examiner

*Primary Examiner* — Audrey B. Walter
(74) *Attorney, Agent, or Firm* — Harness, Dickey & Pierce, P.L.C.

(57) ABSTRACT

An isolator for supporting an exhaust component from a portion of a vehicle via a hanger includes elastomeric isolator element having at least one aperture adapted to receive the hanger and an isolator or bracket for receiving and supporting the elastomeric isolator element. The isolator bracket includes a mounting structure including a first aperture and a second aperture. The isolator bracket is adapted to be fixed to the vehicle by a single fastener extending through the first aperture. The second aperture extends through the isolator bracket and includes an internal wall shaped as a polygon. A target orientation of the isolator bracket relative to the vehicle is obtained when the internal wall of the second aperture is angularly oriented and coaxially aligned with a corresponding aperture in the portion of the vehicle having an internal surface with the same polygon shape as the second aperture.

17 Claims, 4 Drawing Sheets

EXHAUST ISOLATOR BRACKET WITH ALIGNMENT FEATURE

FIELD

The present disclosure relates to a mounting system for coupling an exhaust system to a vehicle.

BACKGROUND

Automotive vehicles may be equipped with an internal combustion engine for providing motive power to driven wheels of the vehicle. An engine exhaust system may include one or more exhaust pipes, catalytic converters, mufflers, and tailpipes in receipt of exhaust gas emitted from the internal combustion engine. The engine exhaust system functions to minimize the noise and release of undesirable constituents of the exhaust gas to the atmosphere.

The exhaust system may be supported by exhaust mounts or isolators that interconnect the exhaust system and the vehicle. More particularly, the isolators are often times mounted to a body or a frame of the vehicle in order to prevent engine movement and or vibrations from being transmitted to the components of the exhaust system or vice versa. The isolators may incorporate flexible mounting members or elastomeric internal components to isolate the vehicle's body from the exhaust system.

In present-day vehicles, many components are positioned under the vehicle body and packaging space for the exhaust system as well as the isolators is limited. Access to fasteners used to attach the isolators to the vehicle may also be limited. Many exhaust isolators are configured to cooperate with a hanger that is attached to the vehicle's frame or some other support structure of the vehicle's body. Alternatively, the hanger may be fixed to one of the components of the exhaust system such as a muffler or an exhaust pipe.

The hanger may be shaped as a cylindrical rod and the isolator may include an aperture in receipt of the rod. To provide the desired vibration isolation function, it may be important to maintain alignment between a centerline of the rod and a geometrical feature of the isolator. Based on the limited packaging space and limited access to fasteners coupling the isolator to the vehicle, it may be challenging for an installer of the isolator to the vehicle to maintain a desired relative position of the isolator to the hanger and/or the vehicle body. Accordingly, it may be desirable to provide an improved isolator having an alignment feature used during the installation process.

SUMMARY

An isolator for supporting an exhaust component from a portion of a vehicle via a hanger includes elastomeric isolator element having at least one aperture adapted to receive the hanger and an isolator or bracket for receiving and supporting the elastomeric isolator element. The isolator bracket includes a mounting structure including a first aperture and a second aperture. The isolator bracket is adapted to be fixed to the vehicle by a single fastener extending through the first aperture. The second aperture extends through the isolator bracket and includes an internal wall shaped as a polygon. A target orientation of the isolator bracket relative to the vehicle is obtained when the internal wall of the second aperture is angularly oriented and coaxially aligned with a corresponding aperture in the portion of the vehicle having an internal surface with the same polygon shape as the second aperture.

A method for mounting an isolator to a vehicle for supporting and exhaust component from the vehicle includes providing an isolator including an elastomeric isolator element and an isolator bracket. The method includes aligning a first aperture of the bracket with a fastener aperture of the vehicle, inserting a fastener through the first aperture of the isolator bracket and the fastener aperture and rotating the fastener to couple the isolator to the vehicle. Prior to applying a final torque to the fastener, the second aperture of the isolator bracket is aligned with a corresponding aperture extending through the vehicle. The method includes inserting a tool having an external surface shaped and sized to correspond with the shape and size of the second aperture and the corresponding aperture. Angular and positional alignment of the isolator relative to the vehicle is maintained via the tool while torque is applied to the fastener. The method is completed by removing the tool from the second aperture and the corresponding aperture.

It should be appreciated that the steps of aligning the second aperture of the isolator bracket with the corresponding aperture extending through the vehicle and inserting a tool within the second aperture and the corresponding aperture may be performed before the steps of aligning the first aperture of the bracket with the fastener aperture of the vehicle and inserting the fastener. If a hand tool such as a drive socket extension is used and equipped with a ball plunger retainer, the tool may assist the installer by coupling the bracket to the vehicle while the installer inserts and begins coupling the fastener to the vehicle.

BRIEF DESCRIPTION OF THE DRAWINGS

In the drawings, reference numbers may be reused to identify similar and/or identical elements.

DETAILED DESCRIPTION

Figure 1:
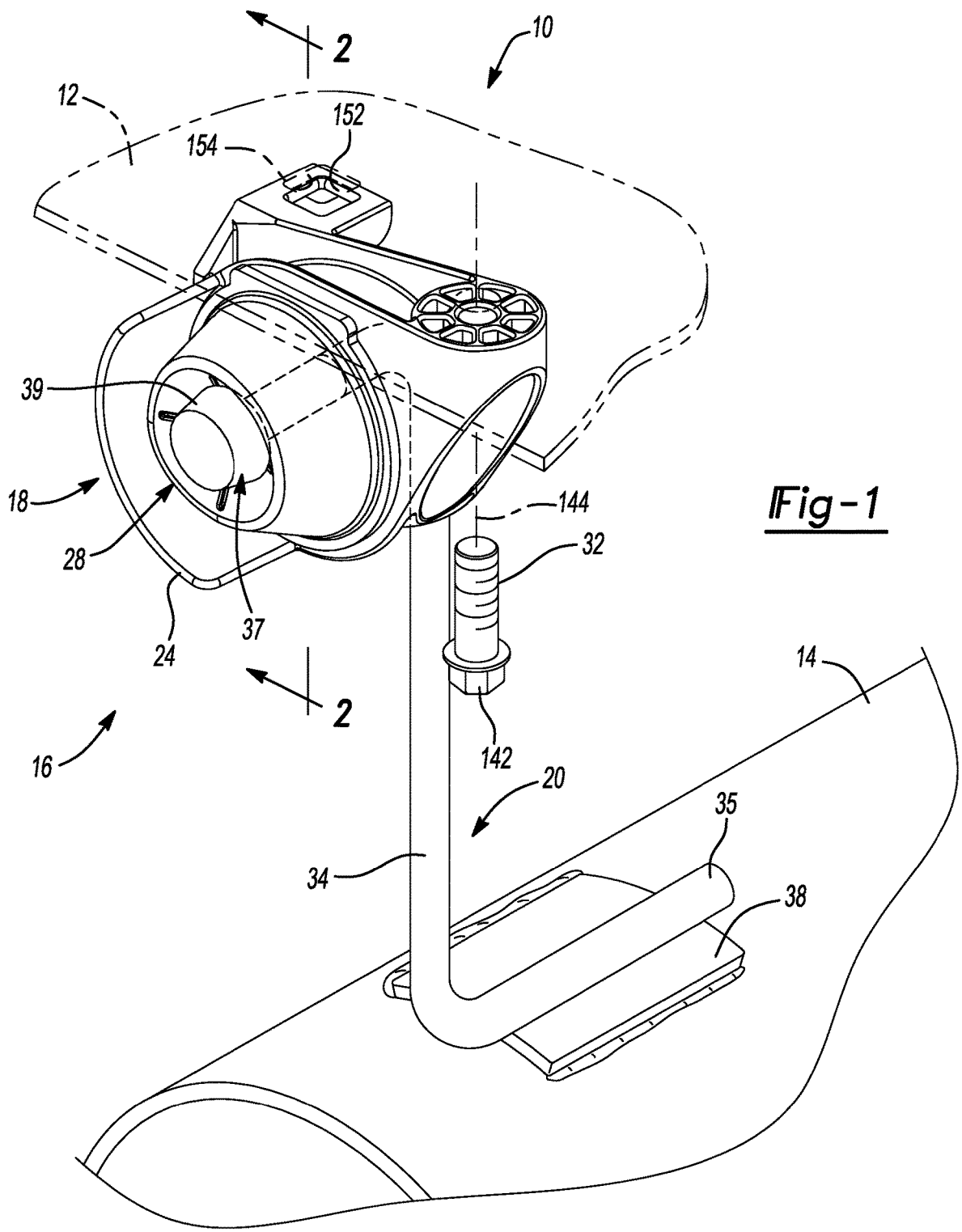
FIG. 1 is a fragmentary perspective view of an exemplary vehicle including an exhaust system component coupled to the vehicle with an isolator constructed in accordance with the teachings of the present disclosure.
Figure 2:
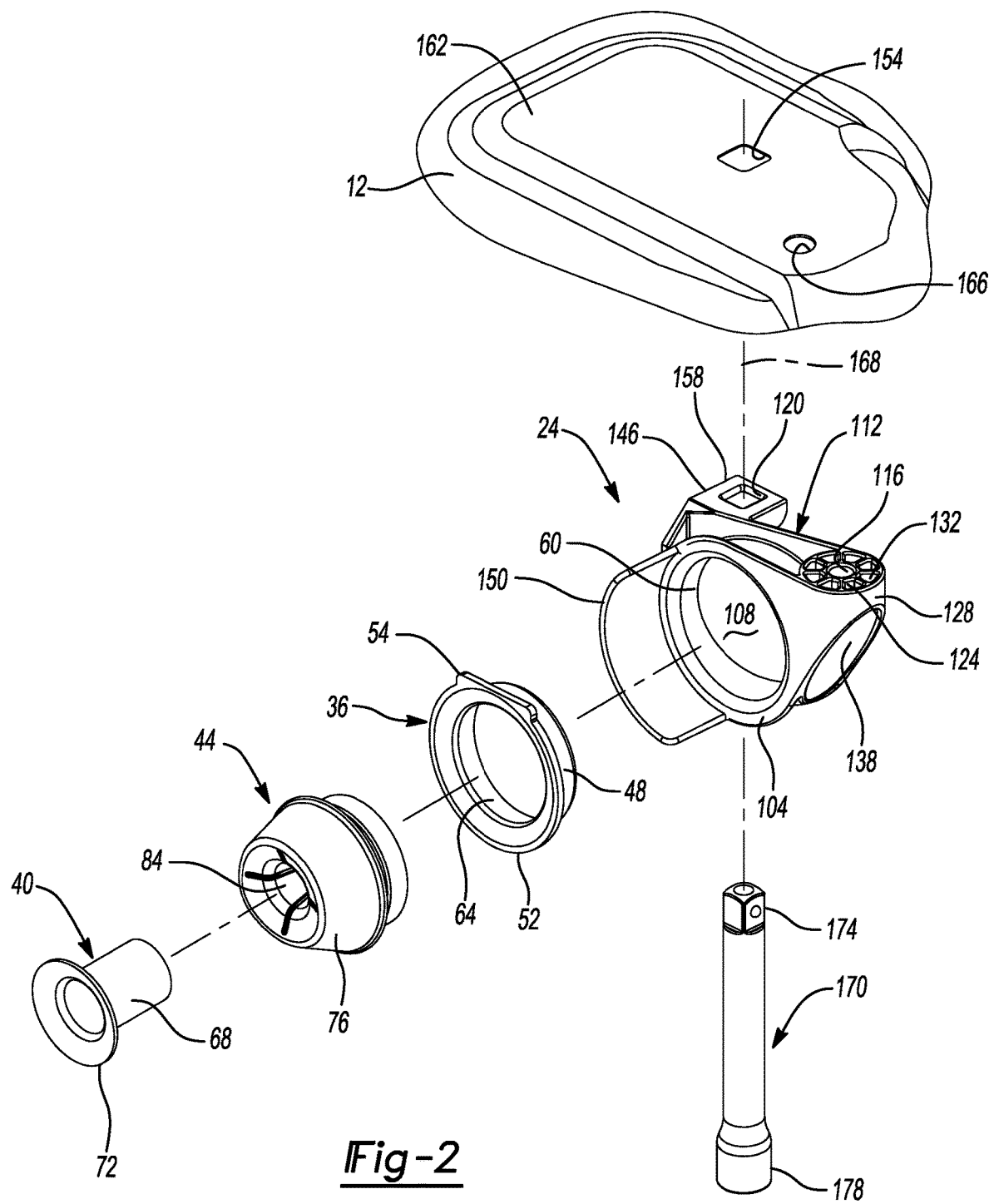
FIG. 2 is an exploded perspective view of the isolator and a tool for aligning the isolator with the vehicle cycle.
Figure 3:
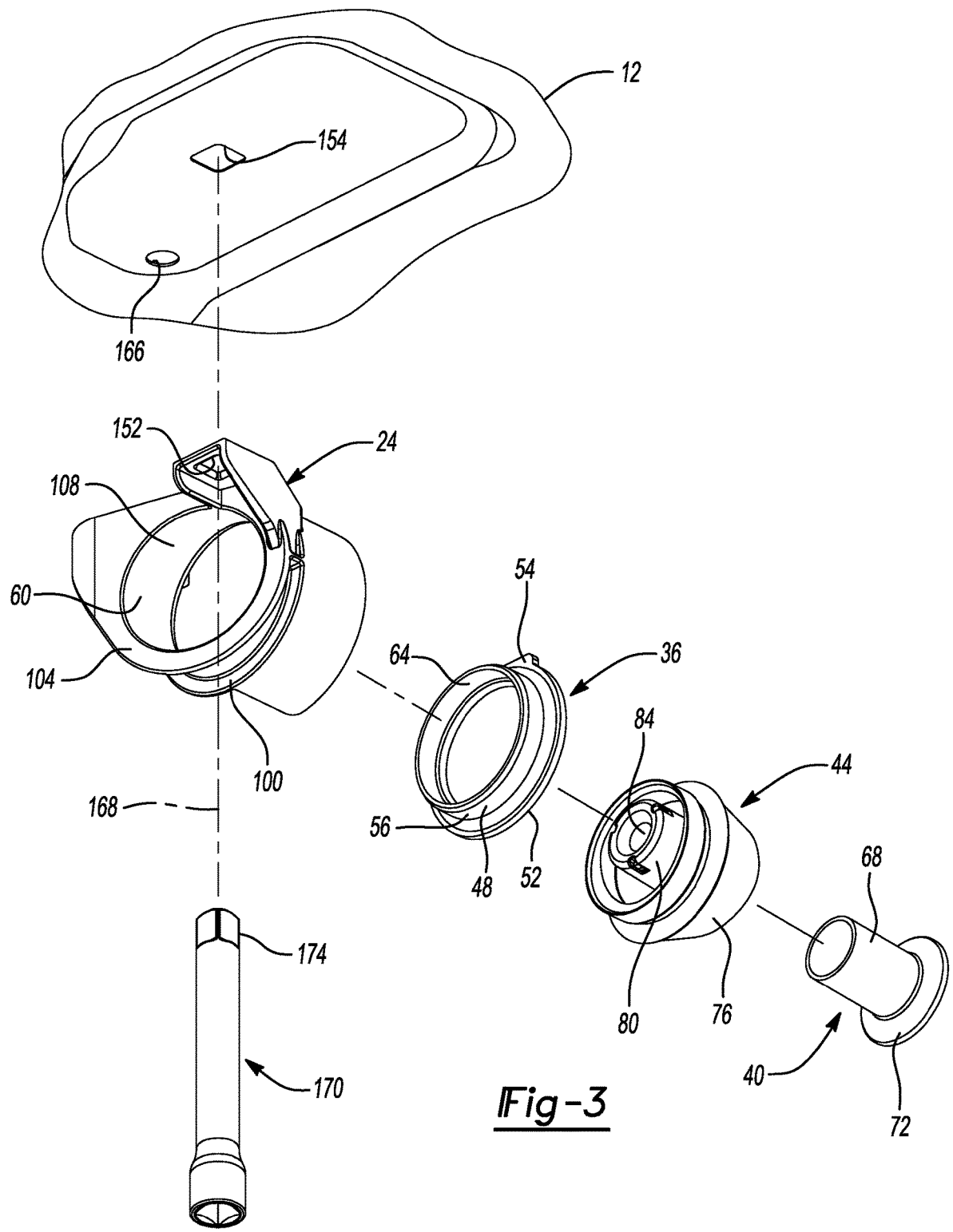
FIG. 3 is another exploded perspective view of the isolator of the present disclosure.
Figure 4:
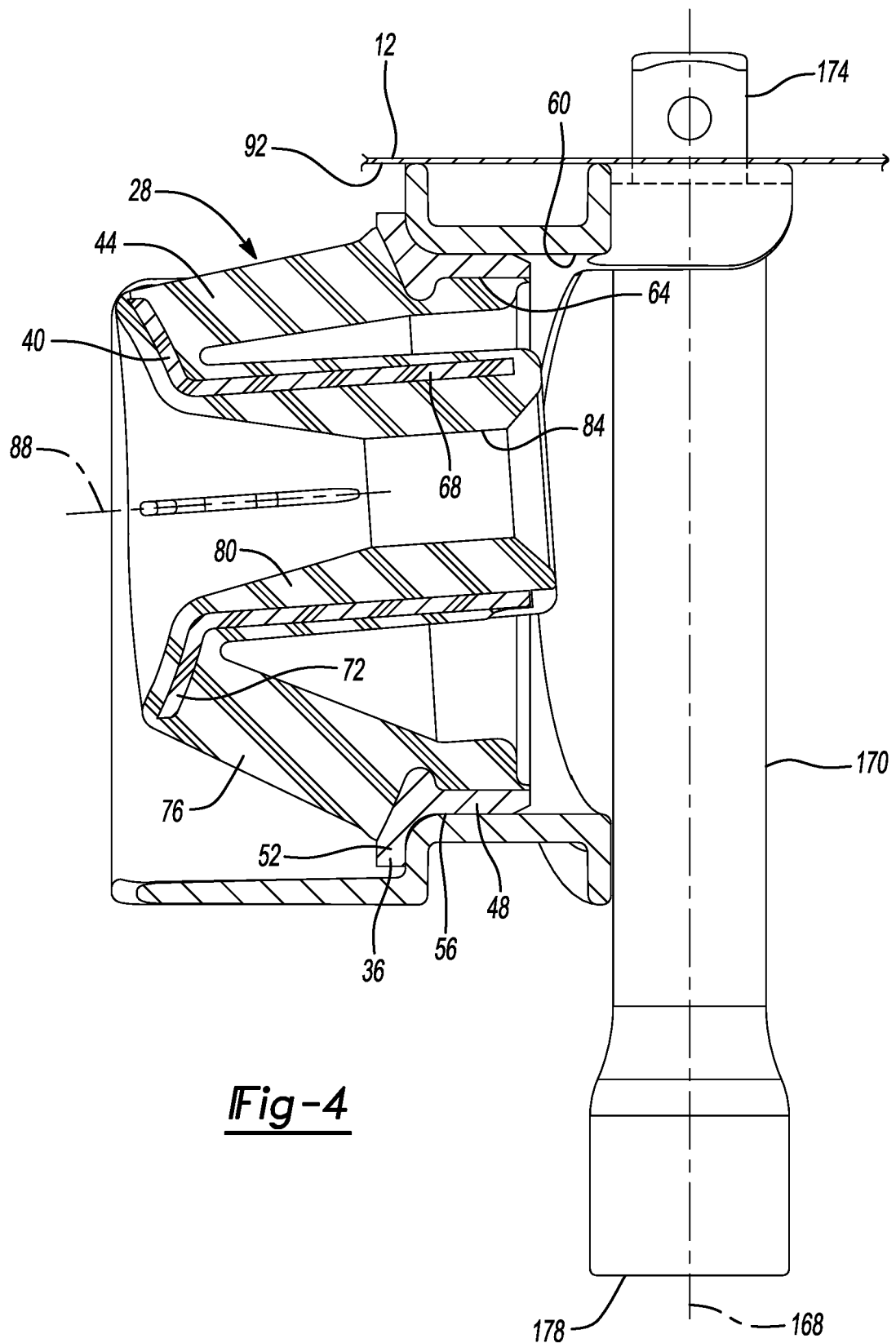
FIG. 4 is a cross-sectional view taken through a centerline of the elastomeric isolator.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIGS. 1-4, an exemplary vehicle 10 includes a body floor pan, frame or other structural member generally identified at reference numeral 12. For convenience, body 12 will be referenced from this point forward. An exhaust system component 14 is coupled to vehicle 10 by a mounting system 16. Exhaust system component 14 may comprise any number of devices including an exhaust pipe, a muffler, a catalytic converter, a silencer, a mixer, an injector, a valve, a tailpipe, or the like.

Mounting system 16 includes an isolator assembly 18 and a hanger assembly 20. In the arrangement depicted in FIG. 1, isolator assembly 18 is coupled to vehicle 10 while hanger assembly 20 is coupled to exhaust system component 14. It should be appreciated that the relative positioning of these components may be reversed such that isolator assembly 18 is directly mounted to exhaust system component 14 and hanger assembly 20 is fixed to vehicle 10. If the relative positioning of the components are reversed from FIG. 1, the alignment feature described in greater detail would not be present in vehicle 10 but present in the exhaust system component.

Mounting system 16 is operable to couple exhaust system component 14 to vehicle 10 in a manner that supports the weight of the exhaust system component from the body 12 of vehicle 10 while minimizing the transmission of vibrations from body 12 to exhaust system component 14 and vice versa. It may also be desirable to minimize the weight, cost and time required to install mounting system 16. To accomplish these goals, isolator assembly 18 includes a bracket 24, an isolator 28 and a single fastener 32 operable to fix bracket 24 to body 12. A mating fastener (not shown) threadingly engages fastener 32 to fix bracket 24 to vehicle 10.

Hanger assembly 20 includes a rod 34 having a first end 35 and an opposite second end 37. Hangar assembly 20 may optionally include a hanger bracket 38 fixed to an external surface of exhaust system component 14 and second end 37 of rod 34. It is contemplated that each of these components are constructed from a mild steel or another metal that may be welded to one another. Second end 37 includes an optional hanger head 39. Hanger head 39 includes a tapered surface such that hanger head 39 may be axially displaced through isolator 28 when positioned as depicted in FIG. 1. The shape of hanger head 39 restricts withdrawal of rod 34 from isolator 28.

Isolator 28 includes an outer tube 36, an inner sleeve 40 and an elastomeric isolator element 44 bonded to each of outer tube 36 and inner sleeve 40. Outer tube 36 is preferably constructed from metal or plastic and includes a hollow cylindrical body 48 and a flange 52. Flange 52 may include a flat 54 extending along a reduced portion of the circumference of outer tube 36. Flat 54 is useful for angularly orienting isolator 28 relative to bracket 24. An external surface 56 of outer tube 36 is pressed into a bore 60 of bracket 24. An inner surface 64 of outer shell 56 is bonded to elastomeric isolator element 44. Inner sleeve 40 is preferably constructed from a metal material. Alternatively, inner sleeve 40 may be a plastic component. Inner sleeve 40 includes a substantially cylindrical hollow tube portion 68 and a conically-shaped flared end 72. Inner sleeve 40 is entirely encapsulated within elastomeric isolator element 44.

Elastomeric isolator element 44 includes an outer shear hub 76 and an inner hub 80 monolithically formed as a one-piece component. An aperture 84 extends through inner hub 80 and is sized for receipt of a portion of hanger assembly 20 as will be described later. Aperture 84 extends along a centerline 88 that may extend in a non-parallel manner to a lower surface 92 of body 12. Alternative configurations may exist where axis 88 extends parallel or at an opposite angle to the one depicted in FIG. 2. For applications in which a relatively large displacement of hanger assembly 20 relative to vehicle 10 is anticipated, the angled axis 88 may optimize stress distribution through elastomeric isolator element 44 during vehicle operation.

Bracket 24 includes a body portion 100 and a circumferentially extending frame portion 104. Circumferentially extending frame portion 104 surrounds bore 60. Bracket 24 further comprises a mounting structure 112 including a first aperture 116 and a second aperture 120. Mounting structure 112 includes an inner tube 124 circumscribed by an outer tube 128. A plurality of radially extending webs 132 interconnect inner tube 124 to outer tube 128. Outer tube 128 includes an inner surface 138 sized for receipt of fastener 32 and a tool suitable to drivingly engage a head 142 of fastener 32 and rotate fastener 32 about a fastener axis 144.

Mounting structure 112 also includes an outwardly protruding tab 146. Second aperture 120 extends through tab 146. It should be appreciated that bracket 24 depicted in the figures is a one-piece monolithic element including each of the features previously described. Bracket 24 may be a die-cast or stamped metal component. Alternatively, bracket 24 may be molded from a plastic material such as 30% glass reinforced nylon 6/6.

An optional shield 150 may also be part of the monolithic bracket 24 to shield isolator assembly 18, and particularly elastomeric isolator element 44, from exposure to a harsh environment including extreme heat, road debris or other assailants to the integrity of the elastomeric material. Shield 150 may be positioned to extend from circumferential frame portion 104 at a radial location precluding an improper orientation of isolator 28. More particularly, flat 54 extends radially to the extent that it would interfere with shield 150 isolator 28 were attempted to be improperly assembled to bracket 24.

As previously discussed, isolator assembly 18 is coupled to vehicle 10 via single fastener 32. As such, a rotational degree of freedom about fastener axis 144 exists during the process of assembling isolator assembly 18 to body 12. To assure a proper angular orientation of isolator assembly 18 to body 12, and thereby exhaust system component 14, second aperture 120 is sized and shaped as a polygon. In the instance depicted in the figures, walls 152 define a ½ inch square aperture identified as second aperture 120. A corresponding aperture 154 extends through body 12.

Corresponding aperture 154 is sized and shaped similarly, if not exactly the same as second aperture 120. Bracket 24 defines a mounting plane 158 that is positioned adjacent to and in contact with a substantially planar land 162 formed on body 12. A fastener aperture 166 is also positioned on land 162 and extends through body 12 for receipt of fastener 32. When first aperture 116 and fastener aperture 166 are aligned, fastener 32 may be axially extended along fastener axis 144 into the pocket defined by inner surface 138 as well as through first aperture 116 and fastener aperture 166. A captured nut or other fastener (not shown) is threateningly engaged with fastener 32 to couple isolator 28 to body 12. When second aperture 120 is aligned with corresponding aperture 154 along a tool insertion axis 168, isolator 28 is located at a desired final assembly position.

A tool 170 may be useful to assure and maintain alignment of second aperture 120 and corresponding aperture 154 along tool insertion axis 168 during a process in which fastener 32 is tightened. It should be appreciated that the size and shape of the polygon defining second aperture 120 and corresponding aperture 154 may include nearly any closed shape useful to impart a rotational alignment or indexing function. The square one-half inch aperture depicted and described allows an installer to utilize a tool common to many mechanics, that of the half-inch drive socket extension.

Tool 170 includes a first end 174 and an opposite second end 178. First end 174 is shaped as a parallelepiped sized to closely fit walls 152 defining second aperture 120 and corresponding aperture 154. Second end 178 may include a receptacle adapted to receive a driven end of another hand tool such as a ratchet, breaker bar or the like (not shown). The class of fit between end 174, walls 152 of second aperture 120 and the walls of corresponding aperture 154 is such that a desired angular orientation of isolator 28 relative to hangar assembly 20 is assured.

In a method of assembling isolator assembly 12 to vehicle 10, a technician would perform the steps previously described of aligning first aperture 116 of isolator 28 with fastener aperture 166 and second aperture 120 with corresponding aperture 154 as well as positioning fastener 32 and in threaded engagement with a mating fastener. The method further involves inserting tool 170 through second aperture 120 and corresponding aperture 154 prior to applying a final torque to fastener 32. In this manner, the technician may easily orient second aperture 120 with corresponding aperture 154 while fastener 32 holds isolator assembly 18 loosely against body 12. Once second aperture 120 and corresponding aperture 154 are in receipt of end 174 of tool 170, the technician may apply torque to fastener 32. Typically, a component to be fastened with only a single threaded fastener will tend to rotate in the direction of the applied torque. Tool 170 resists rotation of bracket 24 relative to body 12 while torque is being applied to fastener 32. At the completion of the torque application step, tool 170 may be simply withdrawn from corresponding aperture 154 and second aperture 120. The clamping force provided by fastener 32 is sufficient to maintain the desired angular orientation of isolator assembly 18 relative to body 12 and exhaust system component 14 during vehicle operation.

Alternatively, it may be beneficial to perform the steps of aligning second aperture 120 of bracket 24 with corresponding aperture 154 extending through the vehicle and inserting tool 170 within second aperture 120 and corresponding aperture 154 before the steps of aligning first aperture 116 of the bracket with the fastener aperture 166 of the vehicle. If tool 170 is equipped with a ball plunger retainer, tool 170 may assist the installer by coupling bracket 24 to body 12 while the installer inserts and begins coupling fastener 32 to the vehicle.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An isolator for supporting an exhaust component from a portion of a vehicle via a hanger, the isolator comprising:
    an elastomeric isolator element having at least one aperture adapted to receive the hanger; and
    an isolator bracket for receiving and supporting the elastomeric isolator element, the isolator bracket including a mounting structure including a first aperture and a second aperture spaced apart from the first aperture, wherein the isolator bracket is adapted to be fixed to the portion of the vehicle by a single fastener extending through the first aperture, the second aperture extending through the isolator bracket and including an internal wall shaped as a polygon, wherein a target orientation of the isolator bracket relative to the vehicle is obtained when the internal wall of the second aperture is angularly oriented and coaxially aligned with a corresponding aperture in the portion of the vehicle having an internal surface with the same polygon shape as the second aperture, wherein the second aperture and the corresponding aperture extending through the portion of the vehicle are adapted to receive a tool having an external surface shaped such that a cross-section through the tool perpendicular to a tool insertion axis has the shape of the polygon.

2. The isolator of claim 1, wherein the isolator bracket includes an integrally formed and outwardly protruding tab, the tab including the second aperture extending therethrough.

3. The isolator of claim 1, wherein the isolator bracket is a die cast metal one-piece component.

4. The isolator of claim 1, wherein the isolator bracket is a stamped steel sheet.

5. The isolator of claim 1, wherein the tool includes a one-half inch drive extension.

6. The isolator of claim 1, wherein the polygon is a square.

7. The isolator of claim 1, wherein the isolator bracket includes a mounting plane through which the first aperture and the second aperture extend, the mounting plane being configured to be positioned adjacent to a substantially planar land on the portion of the vehicle.

8. The isolator of claim 1, wherein the first aperture extends along a first axis and the second aperture extends along a second axis, the first and second axes being parallel to one another.

9. The isolator of claim 8, wherein the aperture of the elastomeric isolator element extends along an axis perpendicular to the first axis.

10. An isolator for supporting an exhaust component from a portion of a vehicle via a hanger, the isolator comprising:
an elastomeric isolator element having at least one aperture adapted to receive the hanger; and
an isolator bracket for receiving and supporting the elastomeric isolator element, the isolator bracket including a mounting structure including a first aperture and a second aperture spaced apart from the first aperture, wherein the isolator bracket is adapted to be fixed to the portion of the vehicle by a single fastener extending through the first aperture, the second aperture extending through the isolator bracket and including an internal wall shaped as a polygon, wherein a target orientation of the isolator bracket relative to the vehicle is obtained when the internal wall of the second aperture is angularly oriented and coaxially aligned with a corresponding aperture in the portion of the vehicle having an internal surface with the same polygon shape as the second aperture, wherein the isolator bracket further includes a frame portion circumscribing a peripheral portion of the elastomeric isolator element without obstructing the aperture in the elastomeric isolator element.

11. The isolator of claim 10, wherein the frame portion and the mounting structure of the isolator bracket comprise a single one-piece component.

12. An isolator for supporting an exhaust component from a portion of a vehicle via a hanger, the isolator comprising:
an elastomeric isolator element having at least one aperture adapted to receive the hanger; and
an isolator bracket for receiving and supporting the elastomeric isolator element, the isolator bracket including a mounting structure including a first aperture and a second aperture spaced apart from the first aperture, wherein the isolator bracket is adapted to be fixed to the portion of the vehicle by a single fastener extending through the first aperture, the second aperture extending through the isolator bracket and including an internal wall shaped as a polygon, wherein a target orientation of the isolator bracket relative to the vehicle is obtained when the internal wall of the second aperture is angularly oriented and coaxially aligned with a corresponding aperture in the portion of the vehicle having an internal surface with the same polygon shape as the second aperture, wherein the isolator includes an outer shell and an inner sleeve spaced apart from one another, the elastomeric isolator element being bonded to each of the outer shell and the inner sleeve.

13. A method for mounting an isolator to a vehicle, the isolator being operable to support an exhaust component from the vehicle, the method comprising:
providing an isolator including an elastomeric isolator element and an isolator bracket, the isolator bracket supporting the elastomeric isolator element, the bracket including a first aperture and a second aperture spaced apart from the first aperture;
aligning the first aperture with a fastener aperture extending through a portion of the vehicle;
inserting a fastener through the first aperture of the isolator bracket and the fastener aperture;
rotating the fastener to couple the isolator to the vehicle;
aligning the second aperture of the isolator bracket with a corresponding aperture extending through the portion of the vehicle;
inserting a tool having an external surface shaped and sized to correspond with the shape and size of the second aperture through the second aperture and into the corresponding aperture extending through the portion of the vehicle;
maintaining angular alignment of the isolator relative to the vehicle via the tool while applying a torque to the fastener; and
removing the tool from the second aperture and the corresponding aperture.

14. The method of claim 13, wherein the second aperture and the corresponding aperture are shaped as a closed polygon, each having the same size and shape.

15. The method of claim 13, wherein the tool includes an extension for a ratchet.

16. The method of claim 13, wherein the bracket includes a circumferentially extending support in receipt of the elastomeric isolator element, the bracket further including an outwardly extending tab, the second aperture extending through the tab.

17. The method of claim 13, wherein the step of inserting the tool through the second aperture is performed before the step of inserting the fastener through the first aperture.

* * * * *